United States Patent [19]
Fukami

[11] Patent Number: 5,299,071
[45] Date of Patent: Mar. 29, 1994

[54] MULTI-CHANNEL DATA RECORDER

[75] Inventor: Tadashi Fukami, Kanagawa, Japan

[73] Assignee: Sony Corporation, Tokyo, Japan

[21] Appl. No.: 103,728

[22] Filed: Aug. 6, 1993

Related U.S. Application Data

[63] Continuation of Ser. No. 791,351, Nov. 14, 1991, abandoned.

[30] Foreign Application Priority Data

Nov. 27, 1990 [JP] Japan ................................ 2-327195

[51] Int. Cl.$^5$ ........................ G11B 5/09; G11B 20/14; G11B 20/16
[52] U.S. Cl. ........................................ 360/48; 360/40
[58] Field of Search ................... 360/48, 40, 27, 19.1, 360/49

[56] References Cited

U.S. PATENT DOCUMENTS 4,583,132  4/1986  Nakano et al. .................... 360/19.1
4,704,640  11/1987  Okamoto et al. .................... 360/32
4,956,726  9/1990  Takimoto et al. .................... 360/27

Primary Examiner—Aristotelis Psitos
Assistant Examiner—Jennifer Pearson
Attorney, Agent, or Firm—Lewis H. Eslinger; Jay H. Maioli

[57] ABSTRACT

In a multi-channel data recorder, digital data for recording is converted to words of reduced length, and data for identifying the data channel is added to the reduced-length data words to produce a signal having a word length compatible for recording by a conventional data recorder.

4 Claims, 5 Drawing Sheets

| CH No. | DATA ALLN |
|---|---|
| DRA1 | 0 1 d d d d d d d 0 0 0 0 0 0 |
| DRA2 | 0 0 1 d d d d d d d 0 0 0 0 0 |
| DRA3 | 0 0 0 1 d d d d d d d 0 0 0 0 |
| DRA4 | 0 0 0 0 1 d d d d d d d 0 0 0 |
| DRA5 | 0 0 0 0 0 1 d d d d d d d 0 0 |
| DRA6 | 0 0 0 0 0 0 1 d d d d d d d 0 |
| DRA7 | 0 0 0 0 0 0 0 1 d d d d d d d |
| DRA8 | 0 0 0 0 0 0 0 0 d d d d d d d |
| DRA9 | 1 1 1 1 1 1 1 1 d d d d d d d |
| DRA10 | 1 1 1 1 1 1 1 0 d d d d d d d |
| DRA11 | 1 1 1 1 1 1 0 d d d d d d d 0 |
| DRA12 | 1 1 1 1 1 0 d d d d d d d 0 0 |
| DRA13 | 1 1 1 1 0 d d d d d d d 0 0 0 |
| DRA14 | 1 1 1 0 d d d d d d d 0 0 0 0 |
| DRA15 | 1 1 0 d d d d d d d 0 0 0 0 0 |
| DRA16 | 1 0 d d d d d d d 0 0 0 0 0 0 |

| | REC DATA |
|---|---|
| 0 1 1 1 | d d d d d d d |
| 0 1 1 0 | d d d d d d d |
| 0 1 0 1 | d d d d d d d |
| 0 1 0 0 | d d d d d d d |
| 0 0 1 1 | d d d d d d d |
| 0 0 1 0 | d d d d d d d |
| 0 0 0 1 | d d d d d d d |
| 0 0 0 0 | d d d d d d d |
| 1 1 1 1 | d d d d d d d |
| 1 1 1 0 | d d d d d d d |
| 1 1 0 1 | d d d d d d d |
| 1 1 0 0 | d d d d d d d |
| 1 0 1 1 | d d d d d d d |
| 1 0 1 0 | d d d d d d d |
| 1 0 0 1 | d d d d d d d |
| 1 0 0 0 | d d d d d d d |

MULTI-CHANNEL DATA RECORDER

This is a continuation of application Ser. No. 07/791,351 filed Nov. 14, 1991, now abandoned.

BACKGROUND OF THE INVENTION

The present invention relates to a multi-channel data recorder, and more particularly is applicable to a data recorder for recording data from a plurality of channels sequentially.

There is so called digital audio tape recorder (DAT) as a magnetic recording apparatus which makes slanted recording tracks sequentially arranged on a magnetic tape by using rotary heads and records digital audio signals on the recording tracks sequentially.

In such digital audio tape recorder, the audio signals are converted into a digital signal for recording and/or reproducing and effectively avoid tone degradation by means of execution of error correcting procedures.

Recently, by using an integrated circuit, an overall shape can be made compact and light-weight.

It is convenient if various data can be recorded by utilizing this kind of digital audio tape recorder.

Further, in such case, it is possible to record or reproduce the data easily using a construction of digital audio tape recorder and to form a compact and light weight tape recorder so that a signal recording format of this digital audio tape recorder can be utilized effectively.

FIG. 1 illustrates a signal recording mode of a digital audio tape recorder (DAT) to record signals on a tape by using so called rotary heads. In the digital audio tape recorder, two signal recording modes, that is, an SP (standard play) mode and an LP (long play) mode, are performed. In the SP mode, an input signal is able to be recorded as data having 16 bits in one word, 48 [kHz] in sampling frequency and two channels (i.e. L and R channels). In the LP mode, the input signal is able to be recorded with the numbers of the recording channels which are increased by two channels as compared to the SP mode.

FIG. 2 illustrates a standard of data conversion/compression in a case where, in the LP mode, the signal with 16 bits in one word is compressed into a signal with 12 bits in one word and is recorded on the tape. The 8 bits of the signal with 16 bits in one word is extracted corresponding to the amplitude level. Range bits of 4 bits representing the amplitude levels (or ranges) are generated and added to the 8 bits of the signal to record as a signal with 12 bits in one word on the tape. The low-order bits following the 8 bits extracted from the signal with 16 bits in one word are omitted when converting/compressing into 12 bits in one word.

SUMMARY OF THE INVENTION

In view of the foregoing, an object of this invention is to provide a multi-channel data recorder capable of effectively utilizing the format of a digital audio tape recorder (DAT) for recording multi-channel data.

The foregoing object and other objects of the invention have been achieved by the provision of a multi-channel data recorder in which a compression signal compressed into a signal with m bits (n>m) in one word is generated by a non-linear quantization processing, for example a bit-reallocation processing, an input signal with n bits in one word corresponding to the signal level of the input signal. By the non-linear quantization processing, identification data with 1 bits ("1" is a letter) which represent the degree of the non-linear quantization processing, for example as range bits as representative of the range of the signal level is generated. The identification data is added to the data compression signal to generate a signal with m+1 ($\leq$n) bits in one word which is recorded on the tape of a magnetic recording apparatus. The magnetic recording apparatus provided for this purpose comprises means for generating a signal with n bits which consists of channel data with m bits in one word, identification data with 1 bits for defining a channel number and redundancy bits with n−(m+1) bits. By constructing this data arrangement, $2^1$ channels of channel data with m bits in one word are recorded on the magnetic tape at the same time by means of the magnetic tape recorder. Thereby, it is possible to record multi-channel data without dropout of information of each channel data.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
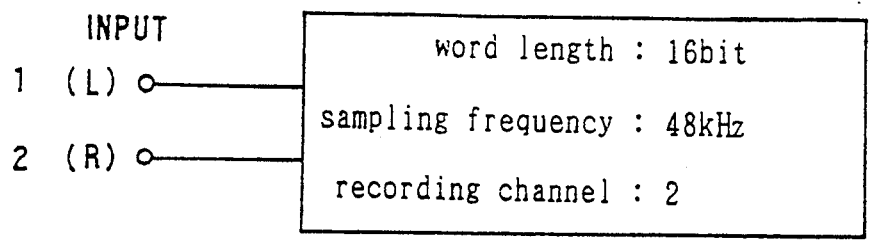
FIG. 1 is a block diagram for explaining a signal recording mode of a certain digital audio tape recorder (DAT)
Figure 1:
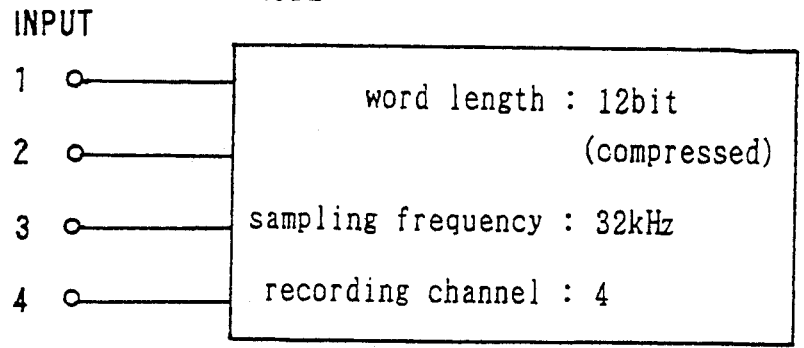
Figure 2:
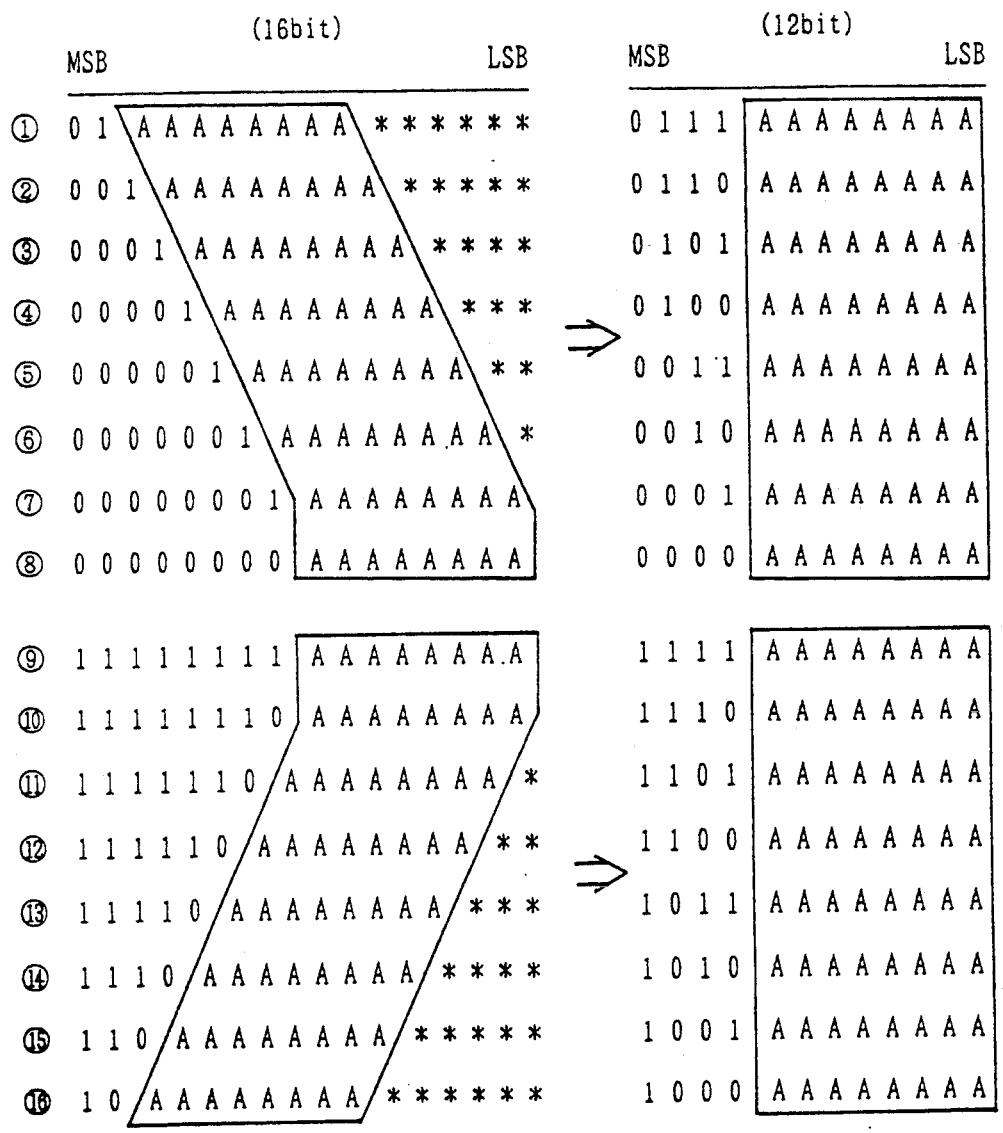
FIG. 2 is a table showing a data conversion/compression standard in the LP mode of the digital audio tape recorder as shown in FIG. 1.
Figure 3:
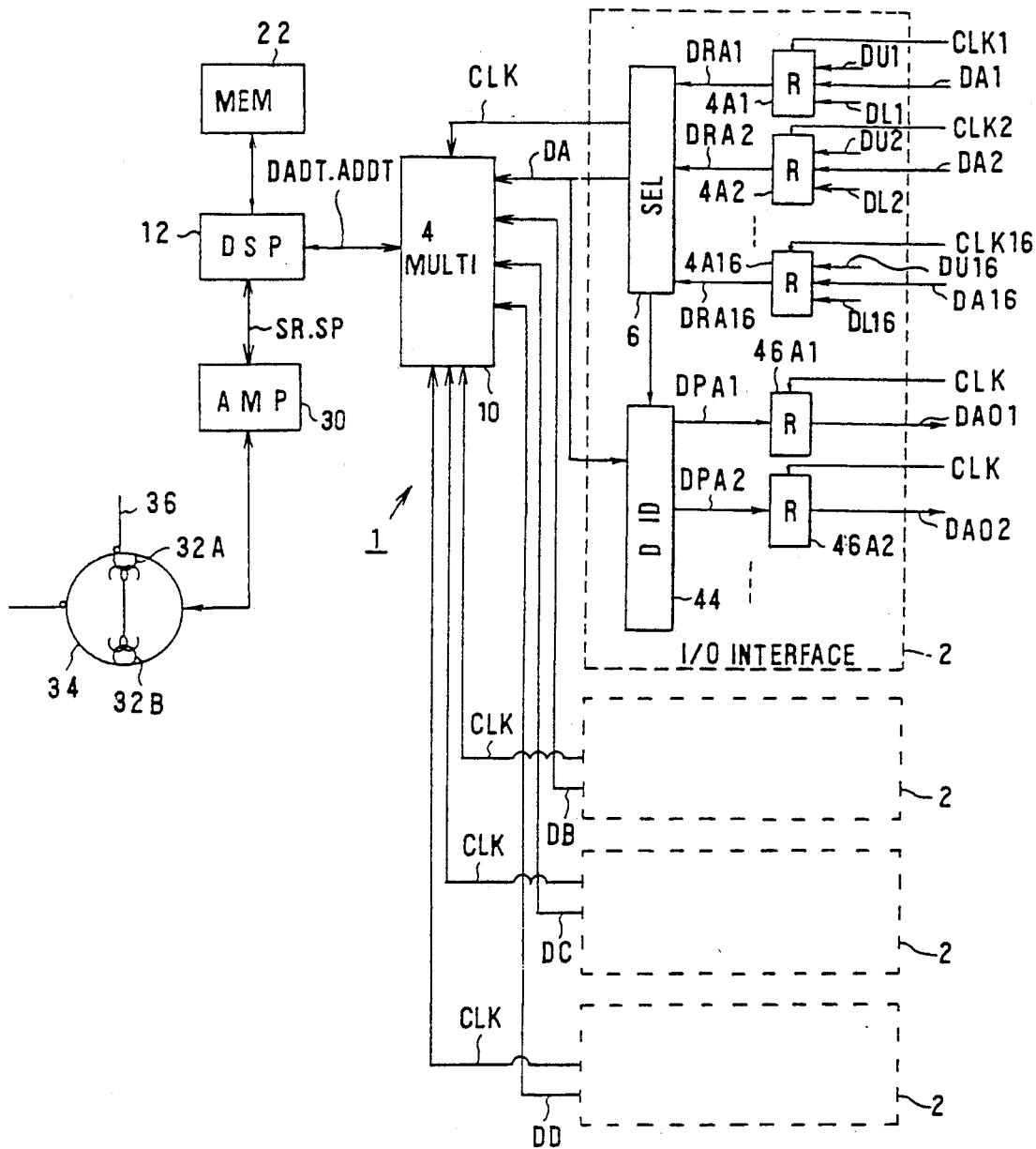
FIG. 3 is a block diagram showing a multi-channel data recorder according to the present invention.

Preferred embodiments of this invention will be described with reference to the accompanying drawings:

Referring to FIG. 3, 1 depicts a data recorder, generally, in which input data (DA1-DA16) of 16 channels (1=4), each of 8 bits (m=8), are inputted from an object to be measured through an input/output circuit 2.

The input data DA1-DA16 are supplied to latch circuits (R) 4A1-4A16, respectively, to which the input data (DA1-DA16) are latched with the clock (CLK1-CLK16) of the respective input data DA1--DA16.

Further, at this time, in addition to the input data DA1-DA16 with transmission rate of 16 [kbps], additive data DU1-DU16 and DL1-DL16 are supplied to the latch circuits (R) 4A1-4A16 from a system control circuit (not shown) so as to be added to the head and the tail of the corresponding input data DA1-DA16, respectively, resulting in recording data DRA1-DRA16.

Figure 4:
FIG. 4 is a data conversion/compression table according to the present invention.

FIG. 4 illustrates a bit allocation to data (8 bits) from the respective data channels.

As shown in FIG. 4, for the input data DA1 (shown by symbol d) of the first channel, an additive data DU1 which is "01" is added to the head thereof and an additive data DU1 which is six "0" bits is added to its tail, resulting in the data DRA1 of 16 bits.

For the input data DA2 of the second channel, an additive data DU2 of "001" is added to the head thereof and an additive data DL2 of 5 "0" bits is added to its tail, resulting in the data DRA2.

In the similar manner, an additive data DU3 of "0001" is added to the head of the input data DA3 of the third channel and an additive data DL3 of 4 "0" bits is added to its tail, resulting in the data DRA3 and an additive data DU4 of "00001" is added to the head of the input data DA4 of the fourth channel and an additive data DL4 of 3 "0" bits is added to its tail, resulting in the data DRA4.

For the input data DA5 and DA6 of the fifth and sixth channels, additive data DU5 and DU6 of "000001" and "0000001", respectively, and additive data DL5 and DL6 of two "0" bits and one "0" bit, respectively, are added to the heads and tails of the input data DA5 and DA6, respectively, resulting in the data DRA5 and DRA6.

Against this, for the input data DA7-DA9 of the seventh-ninth channels, additive data DU7 of "00000001", additive data DU8 of 8 "0" bits and DU9 of 8 "1" bits are added to heads thereof, respectively, resulting in the data DRA7-DRA9.

Further, for the input data DA10 of the tenth channel, an additive data DU10 of "11111110" is added to the head thereof to produce the recording data DRA10, while, for the input data DA11-DA16 of the eleventh-16th channels, additive data DU11-DU16 of "1111110"-"10" are added to heads of the input data and additives DL11-DL16 of one "0" bit-6 "1" bits are added to tails thereof, resulting in data DRA11-DRA16, respectively.

A selector circuit 6 serves to supply to a 4 channel multiplexer 10 the data (DRA1-DRA16) latched in the respective latch circuits 4A1-4A16 sequentially with a predetermined interval.

In this embodiment, other three input/output circuits each identical to the input/output circuit 2 are provided and each output data DA-DD of the input/output circuits is supplied to the four channel multiplexer circuit 10.

Thus, the input data of 16 channels × 4 systems with 8 bits in one word converted into the data with 16 bits in one word and are supplied to the 4 channels multiplexer 10 sequentially.

Figure 5:
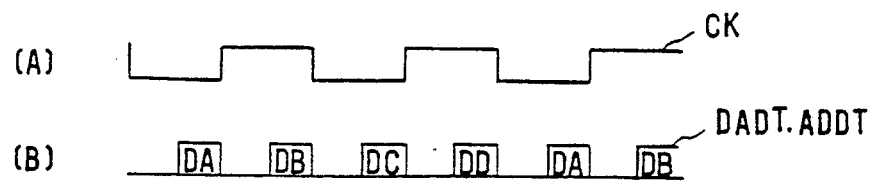
FIG. 5 is a time chart showing a procedure for transforming multi-channel data.

As shown in FIG. 5, in the 4 channels multiplexer circuit 10, the output data DA-DD supplied from each input/output circuit 2 are temporarily stored in the buffer circuit (not shown) and then are outputted sequentially in synchronism with the clock signal CK (FIG. 5A) from the digital signal processing circuit (DSP)12.

By this, the digital signal processing circuit 12 receives transmission data ADDT (FIG. 5B) composed of a series of the output data DA-DD with 16 bits in one word of 64 [kHz] period.

The digital signal processing circuit 12 is a signal processing circuit of an integrated circuit digital audio tape recorder (DAT) and, in this embodiment, processes the reception data DDT in a mode with 32 [kHz] in sampling frequency, 4 channels (i.e. the LP mode) standardized for a digital audio tape recorder having rotary heads (R-DAT).

Figure 6:
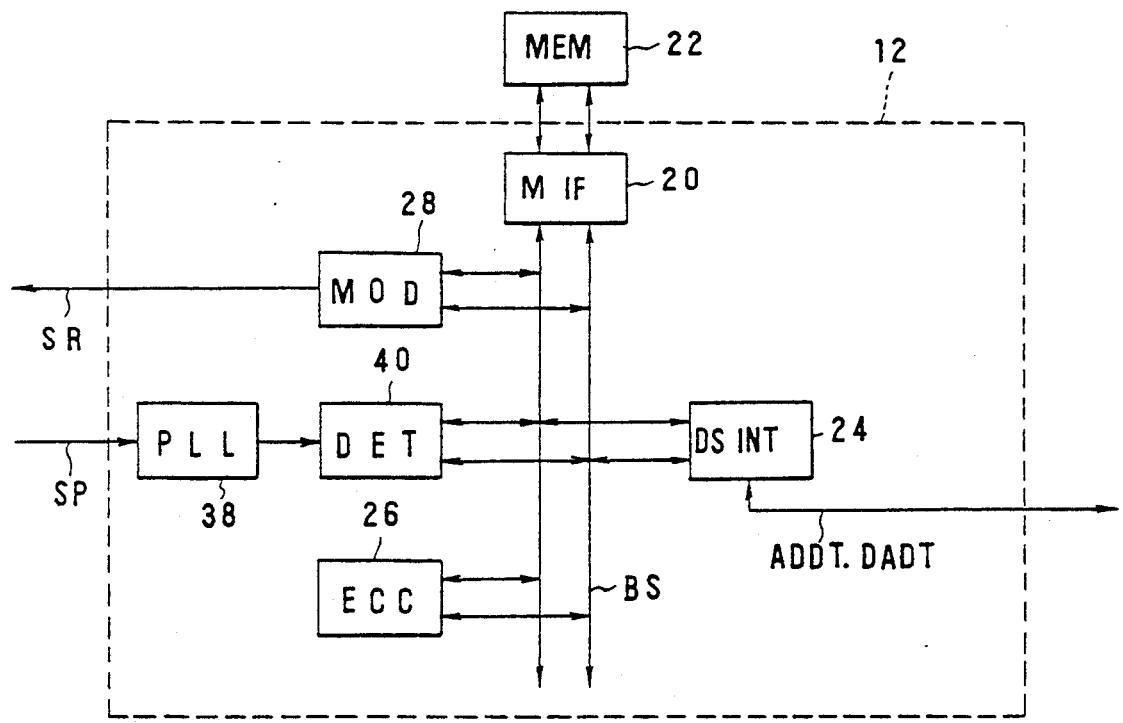
FIG. 6 is a block diagram showing the construction of the digital signal processor (DSP) as shown in FIG. 3.

That is, the digital signal processing circuit 12 receives, on a bus, a control data DC supplied from a system control circuit (not shown) through a data input-/output circuit (data I/O) and stores them in a memory circuit 22 through a memory interface circuit (memory IF) 20 (FIG. 6).

By this, the digital signal processing circuit 12 accesses the control data DC stored in the memory circuit 22 at a predetermined timing and, with a switching of the operation mode of the respective circuit blocks according to the control data DC, is switched to a predetermined operation mode determined as a whole by the control data DC.

In FIG. 6, the construction of the digital signal processing circuit 12 is illustrated.

A digital signal interface 24, in the recording mode, receives the transmission data ADDT, divides with a predetermined interleave period, and stores them temporarily in the memory circuit 22.

The data stored at a predetermined memory area of the memory circuit 22 is interleave processed according to the rule of the mode with 12 bits in word length of 32 [kHz] of sampling frequency by means of the digital input/output circuit 24.

That is, as shown in FIG. 4, for the transmission data ADDT, when the most significant two bits are "01", the subsequent 8 bits are extracted and then assigned as lower significant bits and the identification data or range data corresponding to the signal level "0111" is assigned to the head of this 8 bits data (referred to as compression data, hereinafter) (FIG. 4).

By this, the digital signal processing circuit 24 compresses the 16 bits data DA-DD with 16 bits in one word to data with 12 bits in one word according to the aforementioned standard of the LP mode and stores them in the memory circuit 22.

In the similar manner, when the most significant bits are "001" and "0001", subsequent 8 bits are assigned to lower significant bits, identification data "0110" and "0101" are assigned thereto, and then the resultant is converted into compression data.

In the similar manner, when the most significant bits are "00001" and "000001", subsequent 8 bits are assigned to lower significant bits and identification data "0100" and "0011" are assigned thereto. When the most significant bits are "0000001", "00000001" and "00000000", subsequent 8 bits are assigned to lower significant bits and identification data "0010", "0001" and "0000" are assigned thereto.

Against this, when the most significant bits are "11111111", "11111110" and "1111110", subsequent 8 bits are assigned to lower significant bits and identification data "1111", "1110" and "1101" are assigned thereto.

Further, when the most significant bits are "1111101", "11110" and "1110", subsequent 8 bits are assigned to lower significant bits and identification data "1100", "1011" and "1010" are assigned thereto, and when the most significant bits are "110" and "10", subsequent 8 bits are assigned to lower significant bits and identification data "1001" and "1000" are assigned thereto.

The compression data makes it possible to identify the input data DA1-DA16 from which channel is converted and generated on the basis of the identification data, by adding the additive data (DU1-DU16) and (DL1-DL16) to data (DA1-DA16) with 8 bits in one word inputted into input/output interface 2 and then converting them into data (DRA1-DRA16) with 16 bits in one word corresponding to the signal levels of the input data (DA1-DA16).

In the standard of the 32 [kHz]-4 channels mode (the LP mode) of the digital audio tape recorder, the compression data is standardized so that it is recorded and reproduced integrally with the identification data and the recording data DA–DD of 4 series can be recorded and reproduced distinctively.

Therefore, in the data recorder 1, it is possible to identify, record and reproduce the input data (DA1–DA16) of 16 channels inputted to the respective four input/output circuits 2, so that it is possible to record and reproduce easily the input data with 8 bits in one word of 64 ($=16\times4$) channels by using the recording and reproducing system of the digital audio tape recorder.

According to the present invention, by identifying the input data DA1–DA16 with effectively using the identification data attached in non-linear quantization, and by using the digital audio tape recorder (DAT) as existing the construction can be simplified correspondingly as a whole and it is possible to construct a compact and light weight data recorder 1.

Subsequently it is described now to reproduce the multi-channel data recorded in the LP mode by means of the digital audio tape recorder (DAT) mentioned above.

In a reproduction mode, the digital signal input/output circuit 24 sequentially reads reproduction data which is picked up from the tape and stored in the memory circuit 22 and then outputs a reproduction data DADT reverse-interleaved according to the standard of the 32 [kHz]-4 channels mode (the LP mode).

Further, at this time, the digital signal input/output circuit 24 performs a bit allocation so that the reproduction data with 12 bits in one word becomes a reproduction data with 16 bits in one word on the basis of the identification data of the most significant 4 bits of the reproduction data, and outputs the reproduction data of 16 bits sequentially as the reproduction data DADT.

An error check and correction circuit (ECC) 26 produces, in the recording mode, a parity sign for error check and correction to add to the data ADDT stored in the memory circuit 22 and it is temporarily stored in the memory circuit 22.

The error check and correction circuit 26 executes, in the reproducing mode, an error check and correction process of the reproduction data on the basis of the error check and correction sign reproduced.

A recording signal generation circuit (MOD) 28 reads, in the recording mode, the transmission data ADDT stored in the memory circuit 22 together with the parity sign, etc., and modulates it according to the 8-10 modulation.

Further, at this time, a recording signal SR is generated by a simultaneous 8-10 modulation of a predetermined sub code data. The recording signal is outputted through an amplifier circuit (AMP) 30 shown in FIG. 3 to magnetic heads 32A and 32B.

The magnetic heads 32A and 32B are arranged on a rotary drum 34 with an interval of 180°. The rotary drum 34 with a magnetic tape 36 being wound thereon by an angle of 90° rotates at a predetermined speed.

By this, the data recorder 1 forms sequentially recording tracks according to the 32 [kHz]-4 channels mode standard to be able to record sequentially the input data (DA1–DA16) of 64 channels on the recording tracks.

Against this, in reproduction, the recording signal generation circuit 28 stops its operation and instead thereof a PLL (phase locked loop) circuit 36 and a demodulation circuit (DET) 40 commence operations.

That is, the PLL circuit 36 derives a reproduction clock from the reproduction signal SP extracted through the amplifier circuit 30 in the reproduction.

The demodulation circuit 40 demodulates the reproduction signal SP on the basis of the reproduction clock and stores a resultant reproduction data in the memory circuit 22.

After the error check and correction, the reproduction data stored in the memory circuit 22 is performed in the error check and correction circuit 26, reverse-interleaved in the digital signal input/output circuit 26 and outputted as the sequential reproduction data DADT.

The 4 channels multiplexer circuit 10 shown in FIG. 3 in the reproduction separates the reproduction data DADT to the reproduction data DA–DD of the respective data channels and outputs them.

The respective input/output circuits 2 supply the reproduction data DA–DD to a data identification circuit 44.

The data identification circuit 44 sequentially separates the reproduction data DA–DD to reproduction data (DPA1–DPA16) of 16 channels on the basis of the identification data.

Latch circuits 46A1–46A16 latch the separated reproduction data (DPA1–DPA16) and then derive the channel data with 8 bits in one word assigned to the reproduction data (DPA1–DPA16) according to the conversion procedure shown in FIG. 4.

Thus, by similarly processing the reproduction data (DB-DD) in the 4 data channels input/output circuits 2, it is possible to reproduce the data with 8 bits in one word of 64 channels.

Although, in the above mentioned embodiment, the present invention was described as applied to the 64 ($=16\times4$) channel data recorder, the present invention is not limited thereto and is applicable widely to a data recorder having any number of channels, on demand.

The present invention, that is, is characterized in that, in a case to be able order to record sequentially data with N bits in one word, when the word length (M) of the data to be required recorded is smaller than N i.e. $M<N$, all or a portion of data with (N-M) bits is assigned as data channel identification bits L for defining a data channel and recorded on a recording medium together with the M bits of data. According to the present invention, it is possible to perform a multi-channel data recording in that data channel identification bits are added to data to be recorded and then recorded on a recording medium so that numbers of data channels are increased corresponding to (N-M) so as to satisfy a condition $M+L\leq N$. In reproducing, the M bits data and the L bits data are extracted from N bits data reproduced from the rewording medium to be able to identify the data channel of the M bits data. In the embodiment, a digital audio tape recorder is explained above, but the present invention is not limited thereto. The present invention is applicable to record optically a digital signal on a recording medium. Further, the embodiment described above is explained as a data recorder including a function for identifying a data channel for each multi-channel data, but it is possible to realize so called adapter type data processing apparatus to apply data consisting of an input signal and added data for identification of data channel to an existing data recorder.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A multi-channel data recorder for use with a digital audio tape recording apparatus in which a multiple-bit word length of an audio input signal is reduced to generate a reduced-length audio word, and range identification data corresponding to an amplitude level of the audio word is generated and combined with said reduced-length audio word and recorded on a tape as a combined word having less bits than the multiple-bit word, the recorder comprising:

means for supplying data words in a plurality of channels, each data word having a length equal to said reduced length audio word;

means for supplying channel identification data in place of the range identification data for addition as most significant bits to said data words and zeros as least significant bits to said data words;

adding means connected to said means for supplying data words and said means for supplying channel identification data for adding individual channel identification to each data word having said reduced-length to produce data recording words having a number of bits equal to the multiple-bit word; and means connected to said adding means for supplying said data recording words as input signals to said digital audio tape recording apparatus for recording.

2. The multi-channel data recorder according to claim 1 in which:

said data words are formed each having 8 bits; and said channel identification data is formed of channel identification words each having 4 bits.

3. A multi-channel data recorder in which an input signal with n bits in one word is compressed to data with m bits (n>m) in one word, range identification data with l bits (n≧m+l) representing signal levels of said input signal is added to said each word of the input signal to produce addition result data, and said addition result data is recorded on a recording medium, said data recorder comprising:

a data interface for receiving channel data with m bits in one word from a plurality of data channels and for receiving channel identification data in place of the range identification data for addition as most significant bits to said channel data and for receiving zeroes for addition as least significant bits to said channel data;

said data interface including adding means for adding to each word of channel data said channel identification data and zeroes to form data recording words of n bits; and means connected to said adding means for supplying said data recording words as the input signal for recording on said recording medium.

4. The multi-channel data recorder according to claim 3 in which n=16, m=8 and l=4.

* * * * *